April 24, 1934.  K. S. HOWARD ET AL  1,955,915
RAILWAY TRUCK STRUCTURE
Filed April 21, 1930  2 Sheets-Sheet 1

Inventors
Karl S. Howard
Edwin C. Jackson
By Rodney Bedell

April 24, 1934.   K. S. HOWARD ET AL   1,955,915
RAILWAY TRUCK STRUCTURE
Filed April 21, 1930   2 Sheets-Sheet 2

Inventor
Karl S. Howard
Edwin C. Jackson
By Rodney Bedell
Attorney

Patented Apr. 24, 1934

1,955,915

UNITED STATES PATENT OFFICE 1,955,915

RAILWAY TRUCK STRUCTURE

Karl S. Howard and Edwin C. Jackson, St. Louis, Mo., assignors to General Steel Castings Corporation, Granite City, Ill., a corporation of Delaware Application April 21, 1930, Serial No. 446,125

10 Claims. (Cl. 105—182)

Our invention relates to railway rolling stock and consists in a novel railway truck structure and more particularly to the combination of the air brake cylinder with the truck frame.

Usually brake cylinders have been completed separately from the truck frame structure of the vehicle and have been provided with flanges adapted to be attached to brackets fastened on the vehicle body framing by which the cylinders have been secured in place. Construction of this sort requires frequent inspection to see that the rivets or bolts are tight to insure the maintenance of proper assembly. Such construction results in considerable play in the brake rigging since the brake cylinder is secured to a part that moves in relation to the truck on which the brake beams and their actuating levers are mounted.

The main objects of our invention are to secure rigidity, to decrease maintenance attention and delays and to effect certain other economies and advantages by making the brake cylinders integral with the truck frame and, preferably, with the side pieces of the truck frame.

We also desire to form either the pressure head or the non-pressure head or non-pressure head and housing or pressure head and housing or housing integral with the truck frame.

These structures may be formed integrally with the truck framing by casting or by any combination of the methods of casting, welding, forging etc.

In the accompanying drawings which illustrate our invention—

Figure 1:
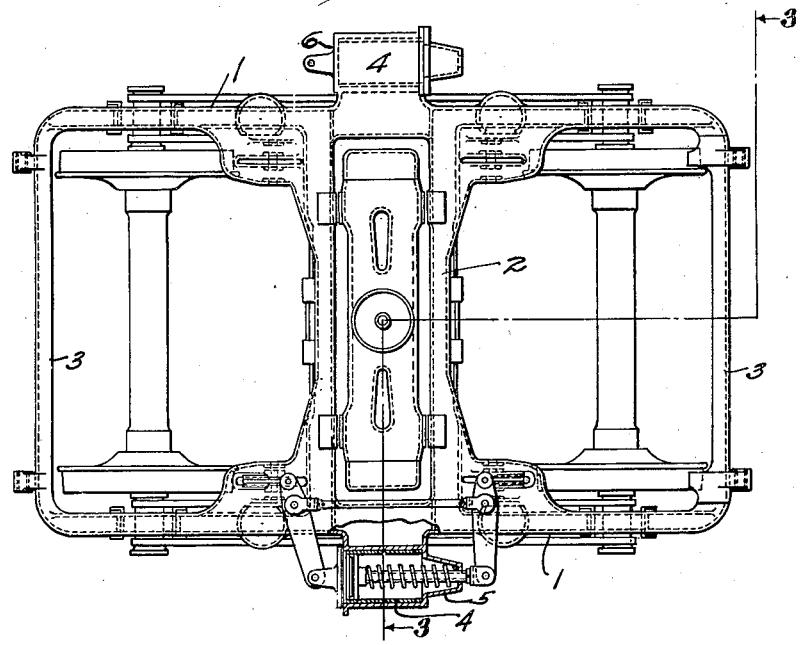
Figure 1 is a top view of a truck frame including brake cylinders as an integral part thereof.

Preferably, our invention is embodied in a one-piece truck frame which may consist of a single casting or may be formed by welding together into an integral whole one or more framing members and the cylinder parts. In the illustrations shown in the first three figures, the side frames of the truck are indicated at 1 and include integral pedestal jaws 7 for journal boxes 8 and are connected by an integral center transom 2 and by integral end sills 3. Integral air brake cylinder housings are indicated at 4 opposite the transom 2. One of the cylinders is shown to have an integral non-pressure head 5, while the opposite cylinder is shown to have an integral pressure head 6. These air brake cylinders are connected to a suitable source of air supply and operate any ordinary braking system.

Figure 4:
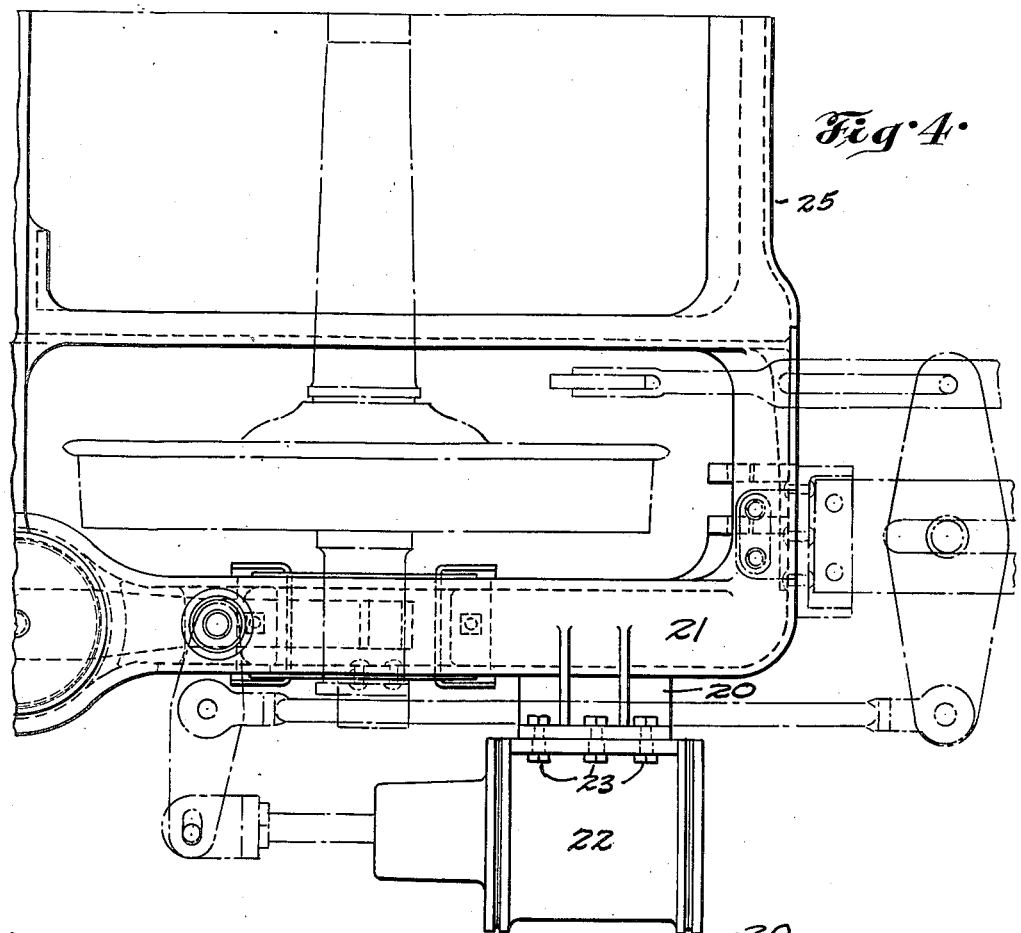
Figure 4 is a top view of substantially an end and side quarter of a modified form of our invention.
Figure 5:
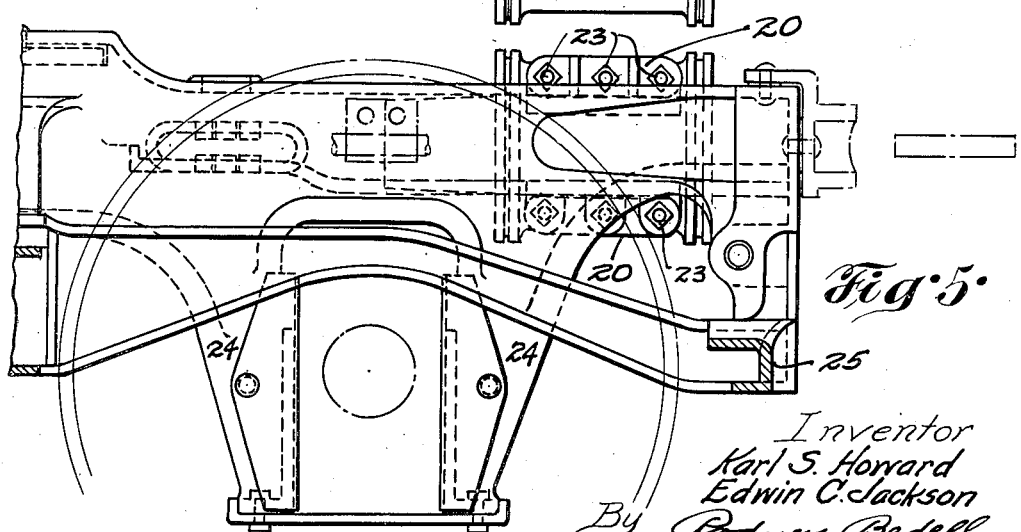
Figure 5 is a longitudinal vertical section of the structure shown in Figure 4.

In the modification illustrated in Figures 4 and 5, an air brake cylinder bracket 20 integral with the side frame 21 mounts an air brake cylinder 22 by means of bolts or rivets 23. The bracket 20 mounts the cylinder 22 between the pedestal forming portion 24 and the end sill 25 and near the end of side frame 21. The structure shown in Figures 4 and 5 may be duplicated at the other side or end of the truck or at the diagonally opposite end.

Figure 2:
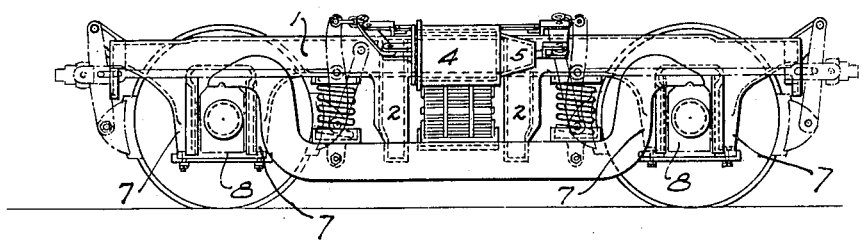
Figure 2 is a side elevation of the structure shown in Figure 1.
Figure 3:
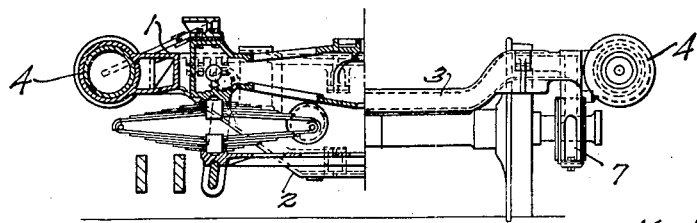
Figure 3 is partially an end view and partially a vertical section taken on the line 3—3 of Figure 1.

If desired, the cylinders in Figures 1, 2 and 3 may be separately mounted on integral brackets such as are shown in Figures 4 and 5 or the cylinders in Figures 4 and 5 may be cast integral with the adjacent portions of the side frame 21 as shown in Figures 1 and 2.

Other details of our construction may be modified without departing from the spirit of our invention and we contemplate the exclusive use of such variations as come within the scope of our claims.

We claim:

1. In a railway truck, a side frame and a brake cylinder body wall formed in part by said side frame and having portions extending above said side frame and integral therewith.

2. In a railway truck, a side frame and a brake cylinder body on the outside of said side frame with its wall formed in part by said side frame and having portions extending above and integral with said side frame.

3. A railway truck side frame having its wall bulged outwardly of the truck throughout a portion of its length and a brake cylinder body integral with the bulged portion of said side frame with the wall of said cylinder body formed in part by said portion.

4. In a railway truck frame, a side member, a transverse transom and a brake cylinder body on the outside of said side member opposite said transom, all of said parts being integrally united and the wall of said cylinder body being formed in part by said side member.

5. A railway truck side frame having a vertical wall with an outwardly projecting cylinder supporting flange forming the head of a brake cylinder body carried by the side frame.

6. A railway truck frame integral device including longitudinal and transverse members having intersecting walls, one of said walls being bulged on its side opposite the side thereof intersected by the other wall and substantially in line therewith to form brake cylinder body structure.

7. A railway truck frame integral device including a side frame wall and spaced transom walls intersecting said side frame wall, said last-mentioned wall being bulged outwardly of the truck adjacent its intersections with said transom walls to form brake cylinder body structure.

8. A railway truck frame integral device including a side frame wall and spaced transom walls intersecting the inner side of said side frame wall, said side frame wall having elements disposed outwardly of the truck substantially in line with said transom side walls and forming brake cylinder structure, at least one of said elements constituting a cylinder head.

9. A railway truck frame integral device including spaced side frames and a connecting transom, said side frames being bulged outwardly of the truck adjacent their intersections with said transom to form brake cylinder structures, and said transom serving to rigidly tie together said cylinder structures and assist in carrying braking forces applied thereto.

10. A railway truck side frame having its wall bulged outwardly of the truck throughout a portion of its length to form brake cylinder body structure with its axis extending longitudinally of said side frame.

KARL S. HOWARD.
EDWIN C. JACKSON.